Sept. 1, 1953          R. O. BILL          2,650,724
ELEVATOR FOR A PORTION OF A VEHICLE BED
Filed July 13, 1951          3 Sheets—Sheet 1
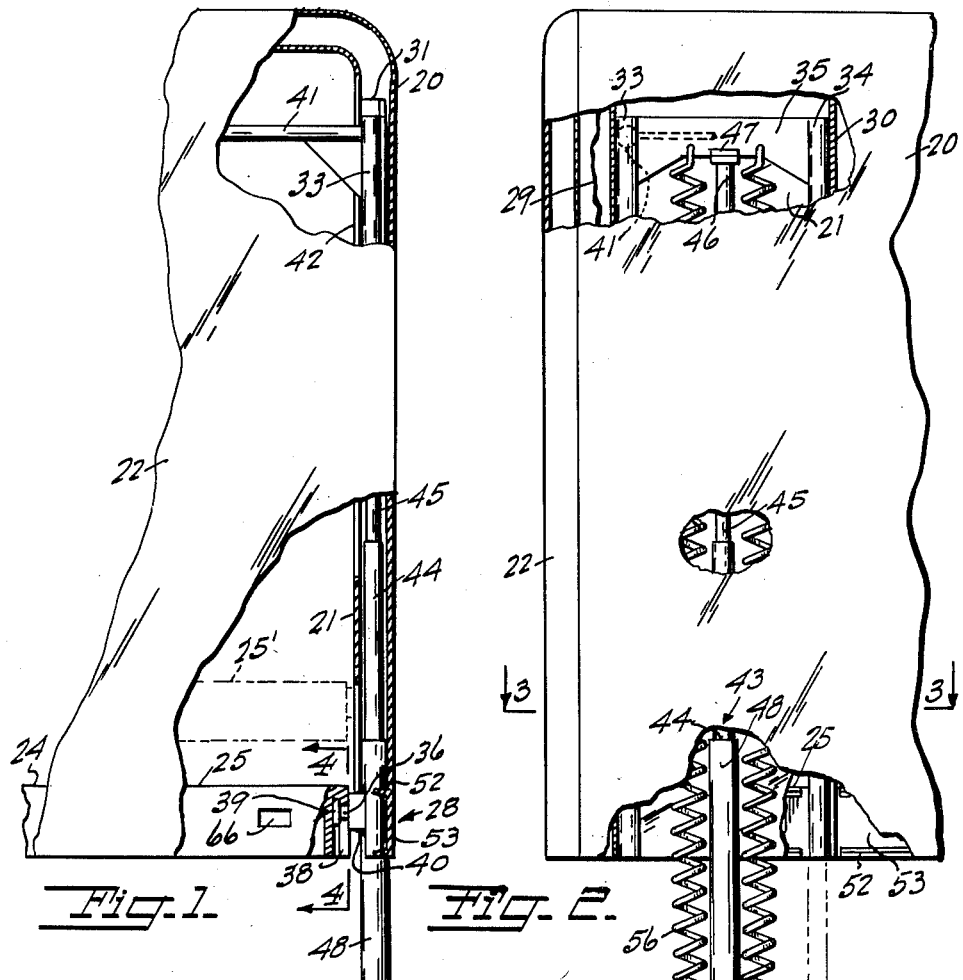
Inventor
Robert O. Bill
By Philip A. Friedell
Attorney Sept. 1, 1953 R. O. BILL 2,650,724
ELEVATOR FOR A PORTION OF A VEHICLE BED
Filed July 13, 1951 3 Sheets-Sheet 2
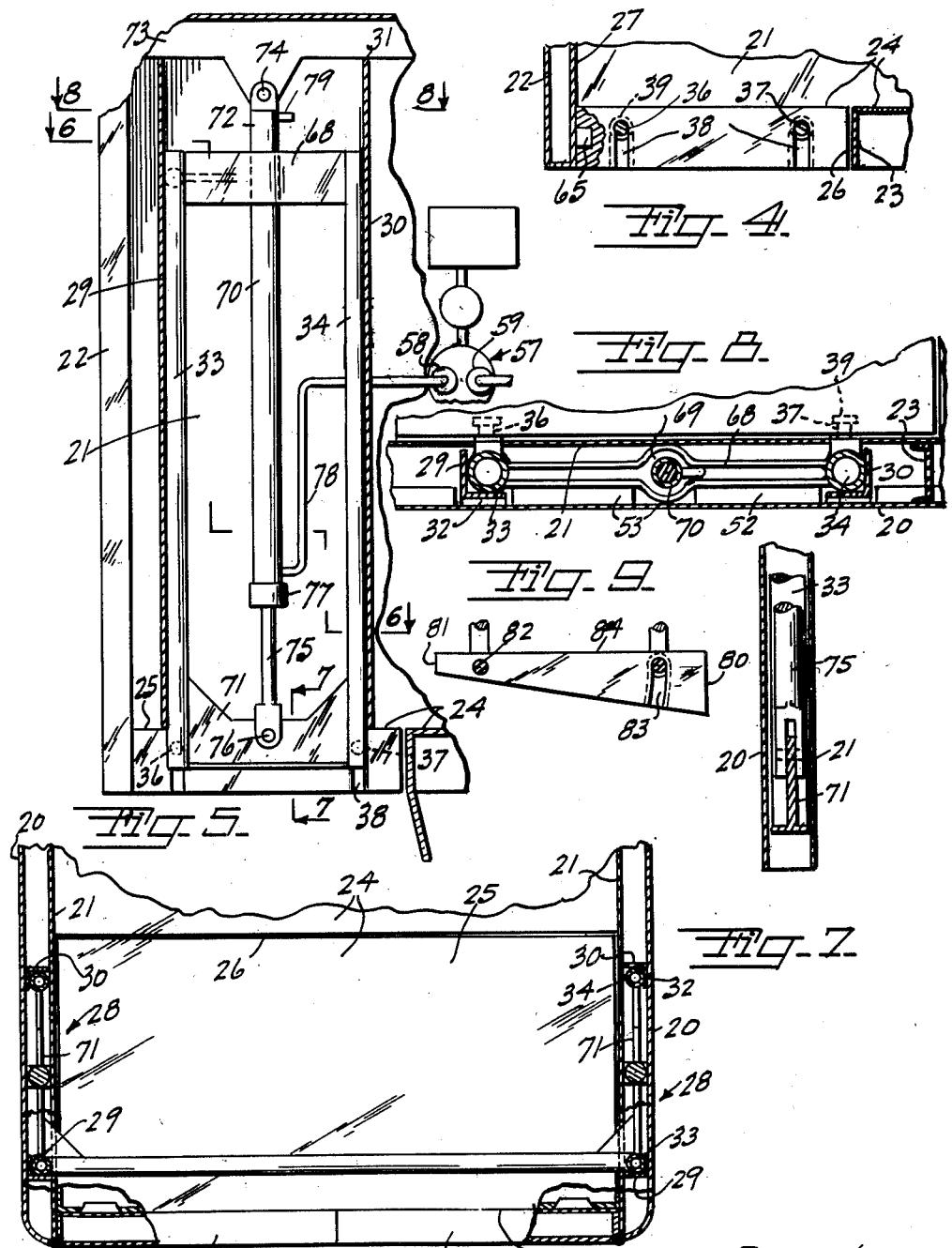

Sept. 1, 1953 R. O. BILL 2,650,724
ELEVATOR FOR A PORTION OF A VEHICLE BED
Filed July 13, 1951 3 Sheets-Sheet 3
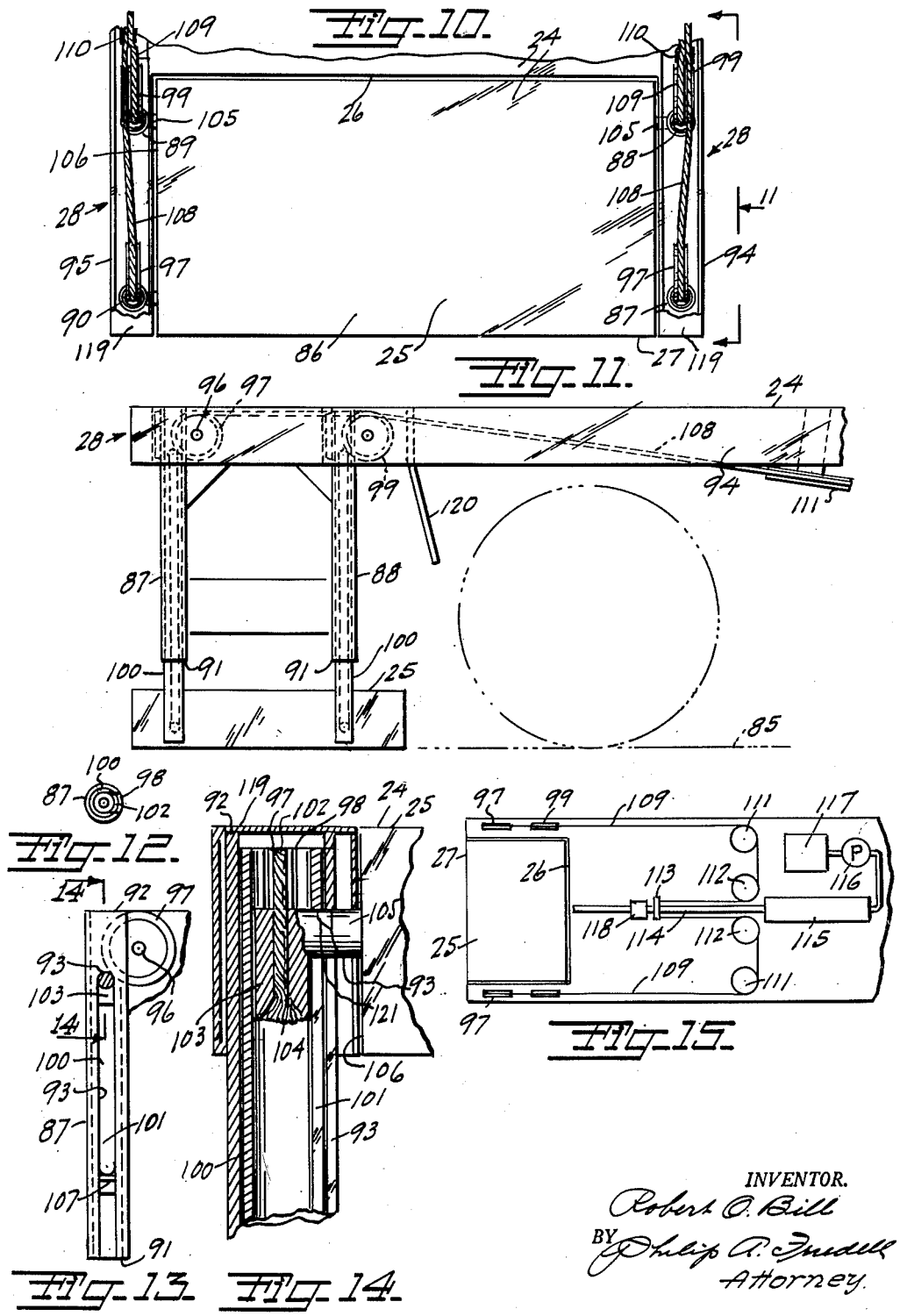
INVENTOR.
Robert O. Bill
BY Philip A. Fuddell
Attorney.

Patented Sept. 1, 1953

2,650,724

UNITED STATES PATENT OFFICE 2,650,724

ELEVATOR FOR A PORTION OF A VEHICLE BED

Robert O. Bill, San Leandro, Calif.

Application July 13, 1951, Serial No. 236,631

1 Claim. (Cl. 214—75)

This invention relates to improvements in vehicles and particularly freight vehicles and provides a vehicle such as a truck or trailer with a bed in which a portion thereof selectively functions as a part of the bed of the vehicle and as an elevator, and thereby differs from all known elevators for trucks and similar vehicles in all of which the elevator is an auxiliary part or attachment consisting of a tail gate or tail board, while in this invention the elevator is an actual portion of the bed of the vehicle.

Furthermore, all elevators for these tail gates or tail boards provide extraneous operating means with complicated support and actuating mechanism and are more or less obstructional, while applicant's is simple and entirely devoid of obstructionism, no part of the mechanism or supports projecting above the surface of a flat bed, or projecting beyond the planes of the outside or inside walls of the body, the appearance of the inside and outside of the vehicle being identical with the same vehicle without the elevator.

One of the principal advantages in applicant's invention exists in the fact that, particularly when the truck or trailer carries way freight, that is, freight destined to a number of different points, the freight for the next point can be loaded on the elevator while the vehicle is in transit to that point and be ready to lower and unload when the point is reached.

Another decided advantage exists in the fact that with applicant's elevator, the rear doors on a refrigerated or freezer truck need not be opened for unloading the freight, thereby conserving the existent freezing temperature within the truck, since the only opening to atmosphere will be through the bed opening while the elevator is lowered, and during each period of loading of the elevator the body is sealed.

The objects and advantages of the invention are as follows:

First, to provide an elevator for a vehicle in which the elevator platform consists of a section of the vehicle bed and forms a part of the bed when in normal elevated position.

Second, to provide an elevator as outlined which provides no obstruction to the interior of the body of the vehicle or to the plane of the bed, irrespective of whether the elevator is applied to a body vehicle or a flat bed vehicle.

Third, to provide an elevator for a vehicle in which no portion of the elevator projects beyond the normal rear end of the vehicle.

Fourth, to provide an elevator as outlined in which the top surface of the elevator platform is coincident with the remainder of the vehicle bed when the elevator is in a normal elevated position, and parallel thereto in all other elevated positions, and conforming to the vehicle supporting surface when in its most lowered position.

Fifth, to provide an elevator as outlined in which all operating media and mechanism are limited to enclosure within the normal structure of the vehicle with the exception of such as extends below the bed of the vehicle, and applying equally to body vehicles and flat bed vehicles, and being therefore nonobstructionable.

Sixth, to provide elevating means as outlined in which a portion of the bed of the vehicle forms the platform for the elevator.

Seventh, to provide an elevator for a vehicle which elevator is simple in construction and operation, and which does not project beyond the normal periphery of the vehicle.

In describing the invention reference will be had to the accompanying drawings, in which:

Fig. 1 is a fragmentary view partly shown in section of a closed or body type of vehicle with my invention applied thereto.

Fig. 2 is a side elevation of Fig. 1 with portions of the wall broken away to show the elevator installation.

Fig. 3 is an enlarged section taken on line 3—3 of Fig. 2 and indicating the power equalizer for coincident lift of all corners of the elevator platform.

Fig. 4 is a section taken on line 4—4 of Fig. 1.

Fig. 5 is a fragmentary view showing a modification of the invention in which the hydraulic jack is of the lifter or pull type.

Fig. 6 is an enlarged section taken on line 6—6 of Fig. 5.

Fig. 7 is an enlarged section taken on line 7—7 of Fig. 5.

Fig. 8 is an enlarged section taken on line 8—8 of Fig. 5.

Fig. 9 shows a modification in the form of the elevator platform to provide a slope when the elevator is at its lowest point resting on a supporting surface.

Fig. 10 is a modification of the invention and showing the top of a flat bed with the cover for the elevating means removed.

Fig. 11 is a side elevation of Fig. 10 viewed in the direction "11" on Fig. 10.

Fig. 12 is a top plan view of one of the elevator guides, of the type illustrated in Fig. 10.

Fig. 13 is an enlarged view of one of the elevator guides for the type illustrated in Fig. 10.

Fig. 14 is an enlarged section taken on line 14—14 of Fig. 13.

Fig. 15 is a diagrammatic view showing the hydraulic-cable hook-up for the type of elevator illustrated in Fig. 10.

In Figs. 1 to 8, the invention is illustrated as applied to a closed or body vehicle and is shown with both, outside walls 20 and inside walls 21 and having rear end doors 22, a type suitable for refrigerated trucks and trailers, or where a smooth or plane inside surface is desirable. In another type, the vehicle body has only an outside wall 20 with structural frame work 23, and in either case, the elevator mechanism is confined within the limits of the structural frame work so as to not offer any obstruction beyond the framework and to simultaneously be protected thereby.

The vehicle has a bed 24, a portion 25 of which forms selectively, a part of the bed and an elevator platform, and extending from a point 26 to the rear end 27 of the bed, the side members 28 of the vehicle being continuous to the end of the bed and spanning the platform section of the bed or elevator platform.

Mounted within the confines of the structural framework of the vehicle are two guides 29 and 30 for each side of the vehicle and illustrated as consisting of structural angles which extend upwardly from the side members practically to the roof of the vehicle as indicated at 31 and which are fixed to the framework or to the wall as indicated at 32 whereby the guides simultaneously provide reinforcement for the body.

An elevator lifting frame is provided for each side of the body and as illustrated consists of two vertical pipes 33 and 34 which are spaced at their upper ends by a crosshead 35 and at their lower ends by journals 36 and 37 which are slidable in T-slots 38 formed in the sides of the elevator platform; the journals each having a head 39 for locking them in the platform; these journals being fixed to the lower ends of the vertical pipes such as by welding indicated at 40. This lifting frame is slidable between the legs of the spaced angles. A cross member 41 may be provided only between the two rear lifting members at which point they will not interfere when the elevator is used as a step when in partly lowered position, but this cross member is not required if the inside of the structural framework is sheathed as indicated at 21 and if used under such conditions a vertical slot 42 must be provided in the inside wall for its passage.

The elevating and lowering means consists of a hydraulic jack 43 consisting of a cylinder 44 and plunger 45, the end 46 of the plunger seating in a socket 47, fixed to the underside of the crosshead 35. A cylinder socket 48 consists of a section of pipe in which the cylinder freely fits and having a combined head and spring yoke 49 fixed to its lower end as by welding indicated at 50, and the fluid connection 51 to the cylinder is made through a passage provided through this head.

The cylinder socket is limited to a diameter not greater than the width of the body framework indicated by the members 23 so as not to project inwardly beyond the inside face of this framework so as to offer no obstruction. The legs 52 of the side member channels 53 for the respective sides of the vehicle are recessed as indicated at 54 with the socket welded to the legs and to the web of the channels as indicated at 55; this socket projecting perpendicularly downward from the underside of the vehicle frame 28 and therefore being integral therewith.

Tension springs 56 cooperate between the crosshead 35 and the spring yoke 49 and are provided to overcome the sluggishness of the fluid used in the jacks. Obviously either one or two springs can be used on each side of the vehicle and the elevator structures are identical on the respective sides though formed in opposition.

As will be noted, the legs of the side channels are also recessed for the guides and for the springs, so as to make the total space between the inside and outside walls or within the limitations of the structural framework available.

This elevator is operated by a power equalizer 57 having two distributing cylinders 58 and 59 which connect to the jacks on the respective sides of the vehicle through the conduits 60 and 61, and a main cylinder 62 having connection with a fluid supply 63 through a pump 64 and which unit may be mounted in any convenient position in or under the vehicle. One form of power equalizer is disclosed in my Patent 2,499,563, issued March 7, 1950, and another being disclosed in my copending application Serial Number 89,425, filed April 25, 1949, now abandoned.

When the vehicle has rear doors 22, the elevator platform can be easily and coincidently locked in normal raised position through the medium of a lug 65 provided on each door near the hinge end, and located to enter a socket 66 formed in the rear end of the elevator platform, though other known locking means can be used if desired.

As will be noted, when the elevator platform is in normal raised position, the top surface is in a plane coincident with the top of the remainder of the bed, this platform being merely the rearward section of the bed between the side members and walls, and normally forms a part of the bed. Merchandise for the next stop can be loaded on this platform and when reached it is merely necessary to start the pump 64 in reverse to retract fluid from the main cylinder 62 which in turn retracts the fluid from the jacks through the medium of the cylinders 58 and 59, or the bypass 67 may be opened to drain the fluid from the main cylinder to the supply, under which conditions the springs 56 will be required if the elevator is lowered light or without load because of the sluggishness of the fluid particularly at low temperatures. Because of the T-slot and headed journal connections between the lifting frame and elevator platform, the platform will conform to the surface on which it comes to rest as indicated at 25'. When in its lowered postion merchandise can be removed from or loaded onto the elevator platform, and to elevate it is merely necessary to deliver the fluid to the main cylinder by any suitable pump 64 which may be either power or hand operated, such as the multiple cylinder pump indicated in the previously mentioned patent under which conditions even the power equalizer may be dispensed with as the multiple cylinders are operated by a single lever and provide equal power distribution. However, for heavy loads, the equalizer is essential as it also forms a power booster for the limited areas of the jacks.

The type illustrated in Figs. 5, 6, 7 and 8 is quite similar to the foregoing except a pull type jack is used which requires some modifications in construction. In this type a spreader 68 supplants the crosshead at the upper ends of the pipes and must have a passage as indicated at 69 for the cylinder 70, the crosshead 71 spanning the lower ends of the pipes and being fixed thereto to form the complete frame. The upper end 72 of the cylinder is pivotally connected to the upper structure 73 of the framework of the body as indicated at 74 while the piston rod 75 is pivotally connected to the crosshead 71 as indicated at 76. This type of jack requires packing and a packing gland 77 and has a power connection to the lower ends of each cylinder as indicated at 78 and a breather passage 79 at the upper end, with the connections 78 from the cylinders on the respective sides of the vehicle connecting to two cylinders respectively 58 and 59 of a power booster. With this arrangement no sockets project below the bed as all mechanism and supporting structure is located above the bed.

A modification of the elevator platform is shown in side view in Fig. 9, the platform being tapered front to rear as indicated at 80—81, the rear support 33 being pivoted to the rear portion as indicated at 82 and the forward portion having its journal 37 operating in a loose or arcuate slot 83. With this type of platform 84 the top surface will be at all times parallel to the top surface of the bed except when the platform comes to rest on the vehicle support surface 85 (indicated in Figs. 2 and 11) at which time the platform will tilt down rearwardly.

The modification illustrated in Figs. 10 to 15 is applicable to flat bed trucks and trailers or any other type of flat bed vehicle, the elevator platform being, like in the previous types, an actual part of the bed 24 of the vehicle, with the side members 26 extending to the rear end 27 of the bed and elevator platform, the side members spanning the elevator portion or platform 86 and terminating at the rear end in the same plane as shown.

Mounted in the side members are spaced main guide members 87, 88, 89 and 90, these members being indicated as tubular members such as steel pipe which are longitudinally slotted as indicated at 93, from the lower end 91 to a predetermined distance from the top end 92 indicated at 93, these pipes being welded in place in recesses provided in the legs of the side member channels 94 and 95 as previously explained for the other types, and extending downwardly to clearance distance from the road bed, in the neighborhood of ten to twelve inches.

Rotatably mounted in front of each of the rear main guides as indicated at 96 is a cable sheave 97 and which operates through a slot 98 provided in the upper forward wall of the guide, and a double sheave 99 is similarly mounted for each of the forward guides.

A secondary guide member 100 of tubular construction is slidable in each of the main guide members and also has a slot 101 which extends from the bottom to a predetermined distance from the top, and also has a slot 102 formed in the upper end to clear the sheave.

Slidable in each of the secondary guide members is a cable anchor 103 in which one end 104 of a cable is fixed, and this anchor has an arm 105 which is slidable in the slots 93 and 101 and which arm is fixed in or integral with the side wall 106 of the elevator platform. After the cable anchor has been inserted in the secondary guide member, a pin 107 or other suitable stop means is fixed in the lower end of the secondary guide.

The cables 108 and 109 on each side of the truck are fixed together as indicated at 110 at a point forwardly from the forward double sheave when the elevator platform is in its lowered position, each of the cables then continuing about a sheave 111 thence about sheaves 112 located in spaced relation to each other from the underside of the bed, a suitable power source such as a hydraulic jack being provided for operation, the terminal ends of the cables being fixed to a crosshead 113 intermediate the length of the plunger 114 of the hydraulic jack 115 which is operated by a suitable pump 116 and fluid supply 117, the end portion of the plunger operating slidably in a bearing 118 for control against flexing. A cover plate 119 is provided for each side member so that when the elevator is in raised position, the entire surface of the bed is closed and in a continuous plane. A guard 120 assures non-obstruction of the elevator platform with any portion of the bed during raising.

When lowering the elevator, the pump 116 is reversed or the fluid is bypassed to the fluid supply, the platform lowering and carrying the secondary guides of the telescopic guides down with it, and when reaching the vehicle supporting surface 85, the platform will conform to that surface because of the slackening of the cables. When elevating the platform the cable anchor 103 rides up within the secondary guide until the arm 105 engages the top wall 121 of the slot and continues by elevating the secondary guide until it is entirely concealed within the main guide as illustrated in Fig. 13, with the top surface of the elevator platform in a plane with the tops of the side members and bed forming a continuous flat bed with no projections of any kind above the top of the bed, all mechanism being concealed within the side members and covered by the cover plates 119.

Thus an elevator is provided which normally is a part of the bed of the vehicle, which elevator can be raised or lowered at will, and can even be raised to a level above the main portion of the bed as indicated at 25' in Fig. 1 for transfer of merchandise from platforms which are at a higher level than the bed, and which, with variations in construction as illustrated is adaptable to either, body vehicles or flat bed vehicles, without providing any obstructions, either along the bed or along the walls of the body. Obviously the type shown in Figs. 10 to 15 can also be used with vehicles having bodies, and either type is adaptable to hand operation or power operation. This elevating and lowering means is not to be confused with tail board or tail gate elevators since such do not form an actual part of the bed, and they project beyond the vehicle bed or body, thereby being unlike applicant's, with no projections beyond the end of the vehicle, and no obstructions on the bed or within the vehicle.

I claim:

A vehicle having a bed, a body including structural frame work, side members for supporting said bed and said body, a combined bed section and elevator platform formed from the rearward portion of said bed between said side members, elevating and lowering means cooperative between said platform and said side members and limited to the space occupied by said structural frame work to maintain the inside of the vehicle including bed and body free of obstructions; said elevating and lowering means comprising a tubular socket fixed in each side member and depending from the under side thereof a hydraulic jack for each socket and having a cylinder seated in its socket and each having a plunger cooperating with its frame for elevating and lowering said platform at will, a combined base and spring yoke fixed to the bottom of each socket, tension springs cooperating between said frame and said combined base and spring yoke for urging lowering of said platform for overcoming sluggishness of the hydraulic jack operating fluid.

ROBERT O. BILL.

References Cited in the file of this patent

UNITED STATES PATENTS

| Number | Name | Date |
|---|---|---|
| 671,987 | Wall | Apr. 16, 1901 |
| 999,163 | Hall et al. | July 25, 1911 |
| 2,158,596 | Swanson | May 16, 1939 |
| 2,200,436 | Van Blarcom et al. | May 14, 1940 |
| 2,498,161 | Hamilton | Feb. 21, 1950 |
| 2,513,355 | Peckinpaugh | July 4, 1950 |
| 2,530,341 | Satsky | Nov. 14, 1950 |
| 2,590,591 | Winkler | Mar. 25, 1952 |

FOREIGN PATENTS

| Number | Country | Date |
|---|---|---|
| 486,962 | Great Britain | June 14, 1938 |